United States Patent
Stoughton et al.

(10) Patent No.: US 10,248,914 B2
(45) Date of Patent: Apr. 2, 2019

(54) SUSTAINING A FLEET OF CONFIGURATION-CONTROLLED ASSETS

(75) Inventors: Chris Stoughton, St. Louis, MO (US); Jenny B. Thompson, Long Beach, CA (US); Peter M. Gould, Eureka, MO (US); Alan J. Bacon, Oakville, MO (US); Dean C. Hooks, Kirkwood, MO (US); Robert W. White, Wentzville, MO (US); Barry R. Fox, Ballwin, MO (US); Janet E. Oakes, Bridgeton, MO (US); Robert M. Beggs, West Chester, PA (US); Kim Bonin, St. Louis, MO (US); Terence M. Burke, Collinsville, IL (US)

(73) Assignee: The Boeing Company, Chicago, IL (US)

( * ) Notice: Subject to any disclaimer, the term of this patent is extended or adjusted under 35 U.S.C. 154(b) by 2241 days.

(21) Appl. No.: 11/559,492

(22) Filed: Nov. 14, 2006

(65) Prior Publication Data

US 2007/0124189 A1 May 31, 2007

Related U.S. Application Data

(60) Provisional application No. 60/740,351, filed on Nov. 29, 2005.

(51) Int. Cl.
*G06Q 10/06* (2012.01)
*G06Q 10/08* (2012.01)
(Continued)

(52) U.S. Cl.
CPC .......... *G06Q 10/06* (2013.01); *G06Q 10/063* (2013.01); *G06Q 10/08* (2013.01); *G06Q 10/20* (2013.01);
(Continued)

(58) Field of Classification Search
CPC ..................................................... G05B 19/418
(Continued)

(56) References Cited

U.S. PATENT DOCUMENTS 5,581,462 A * 12/1996 Rogers ............................. 701/3
5,890,134 A 3/1999 Fox
(Continued)

FOREIGN PATENT DOCUMENTS

WO 2005106666 A1 11/2005
WO 2005107409 A2 11/2005
WO 2005109127 A1 11/2005

OTHER PUBLICATIONS

International Search Report of PCT/US06/44850; dated Sep. 24, 2007; 10 pages.
(Continued)

Primary Examiner — Maria C Santos-Diaz
(74) Attorney, Agent, or Firm — Armstrong Teasdale LLP

(57) ABSTRACT

Methods, systems, and computer program products sustain a fleet of configuration-controlled assets. The method involves integrating a plurality of previously separate systems with reusable business transactions associated with managing a fleet of vehicles. The method also involves receiving operational data associated with a vehicle of the fleet, integrating the operational data per customer requirements, packaging and distributing the operational data to the plurality of systems, and installing and distributing the operational data to one or more applications of the plurality of systems utilizing reusable business transactions. The system utilizes a plurality of applications and a plurality of logical subsystems, which are connected to each other through gateways. The logical subsystems use a common format defined by a set of messages. However, the applications can use a plurality of different formats. The gateways, which are the
(Continued)

FIG. 3A connecting blocks, convert the data flow between the logical subsystems and the applications.

20 Claims, 10 Drawing Sheets

(51) Int. Cl.
    *G06Q 10/00* (2012.01)
    *H04L 29/08* (2006.01)
(52) U.S. Cl.
    CPC .... *H04L 67/12* (2013.01); *G05B 2219/31348* (2013.01); *G05B 2219/31396* (2013.01); *G05B 2219/32024* (2013.01); *G05B 2219/32234* (2013.01); *G05B 2219/36542* (2013.01)
(58) Field of Classification Search
    USPC .......................................................... 705/8
    See application file for complete search history.

(56) References Cited

U.S. PATENT DOCUMENTS

| | | | |
|---|---|---|---|
| 6,738,975 B1* | 5/2004 | Yee et al. | 719/310 |
| 6,885,902 B2 | 4/2005 | Crampton et al. | |
| 6,898,472 B2 | 5/2005 | Crampton et al. | |
| 7,058,587 B1 | 6/2006 | Horne | |
| 2002/0010615 A1* | 1/2002 | Jacobs | 705/9 |
| 2002/0013731 A1 | 1/2002 | Bright et al. | |
| 2002/0049622 A1 | 4/2002 | Lettich et al. | |
| 2002/0138324 A1 | 9/2002 | Zarefoss et al. | |
| 2002/0147622 A1 | 10/2002 | Drolet et al. | |
| 2003/0033180 A1 | 2/2003 | Shekar et al. | |
| 2003/0105887 A1* | 6/2003 | Cox et al. | 709/328 |
| 2003/0109973 A1 | 6/2003 | Hensey et al. | |
| 2003/0120584 A1 | 6/2003 | Zarefoss et al. | |
| 2003/0126023 A1 | 7/2003 | Crampton et al. | |
| 2003/0171970 A1* | 9/2003 | Kinsella | 705/9 |
| 2003/0172135 A1* | 9/2003 | Bobick et al. | 709/220 |
| 2004/0019494 A1 | 1/2004 | Ridgeway et al. | |
| 2004/0128176 A1 | 7/2004 | Jordan et al. | |
| 2005/0065678 A1* | 3/2005 | Smith et al. | 701/29 |
| 2005/0076221 A1* | 4/2005 | Olkin et al. | 713/176 |
| 2005/0080593 A1* | 4/2005 | Blaser | 702/183 |
| 2005/0114090 A1* | 5/2005 | Black | G05B 23/0294 702/188 |
| 2005/0171835 A1* | 8/2005 | Mook et al. | 705/11 |
| 2006/0015455 A1 | 1/2006 | Hahn-Carlson et al. | |
| 2006/0149571 A1* | 7/2006 | Birch et al. | 705/1 |
| 2006/0173775 A1 | 8/2006 | Cullen, III et al. | |
| 2006/0217993 A1* | 9/2006 | Anderson | 705/1 |
| 2007/0112576 A1* | 5/2007 | Avery et al. | 705/1 |
| 2007/0118502 A1* | 5/2007 | Aragones et al. | 707/2 |

OTHER PUBLICATIONS

EP Search Report of EP 06838030; dated Mar. 25, 2011; 5 pages.
Notice from the European Patent Office dated Oct. 1, 2007 concerning business methods; dated Nov. 2007; 2 pages.

* cited by examiner

SUSTAINING A FLEET OF CONFIGURATION-CONTROLLED ASSETS

CROSS REFERENCE TO RELATED APPLICATIONS

The present application claims priority to U.S. provisional patent application entitled "SUSTAINING A FLEET OF CONFIGURATION-CONTROLLED ASSETS" having Ser. No. 60/740,351, filed Nov. 29, 2005, which is hereby incorporated by reference in its entirety.

BACKGROUND OF THE INVENTION

The present invention generally relates to integrating a plurality of applications for sustaining the readiness of a fleet of assets, such as vehicles and/or aircraft and, more particularly, relates to a method of integrating a plurality of applications by creating different system layers to facilitate replacement of each application and prevent modification of the rest of the applications.

The fleet vehicle industry and customers have identified integrated information and decision support as key to both fleet support and vehicle readiness, with war-fighter readiness as a specific example. Both customers and industry are investing in system capabilities to leverage automation and decision support in the sustainment environment. Because fleet operations can be critical and each customer has unique needs, there is a need for robust, flexible, and tailored systems and processes.

Generally, in a fleet management system, applications perform particular tasks such as integrated vehicle health management, maintenance management, materials management, engineering analysis, and training management. Each application may include both processes and support resources such as manuals, historical data, and personnel data. In operation, a fleet management system exchanges information with different applications, as needed, in order to analyze the current condition of the fleet, make decisions, and create course of action.

Typically, applications designed for the sustainment of the fleet include existing, or "legacy," applications and new applications with capabilities necessary to adapt to the changing operational needs of the fleet. The entities which comprise the fleet may be independent of one another but still use the same suite of applications. In other words, integrated fleet management systems often need to accommodate multiple and distinct fleets of assets. Historically, however, these systems are not flexible enough to accommodate easy modification of the underlying suite of applications.

For example, some conventional systems for the sustainment of a fleet of configuration-controlled assets consist of an integration of domain-specific sustainment applications built on a point-to-point architecture. This architectural approach, as opposed to a more flexible design based on an open definition of system-to-system interfaces, requires redevelopment of each system interface when new integration needs arise, thus resulting in increased development costs. In addition, conventional systems do not offer domain-specific knowledge optimization.

Accordingly there is a need in the industry to address how to develop a fleet management system to simplify future modifications of the system and reduce time and cost associated with each modification. There is also a need to address the aforementioned and other deficiencies and inadequacies.

BRIEF DESCRIPTION OF THE INVENTION

In one aspect, a computer-implemented method for sustaining a fleet of configuration-controlled assets is provided. The method includes integrating a plurality of previously separate systems with reusable business transactions associated with managing a fleet of assets wherein functional capabilities of the previously separate systems are defined by the reusable business transactions. The method also includes receiving operational data associated with at least one asset of the fleet, integrating said data per customer requirements, packaging and distributing said data to the plurality of systems, and installing and distributing said data to one or more applications of the plurality of systems utilizing at least one of the reusable business transactions.

In another aspect, a computer-implemented system for integrating a plurality of applications is provided. The system comprises an integration manager operative to manage the insertion and removal of applications to and from the plurality of applications, an integration gateway operative to interface reusable business transactions and the plurality of applications, one or more application adapters interfacing the plurality of applications with the integration gateway, an intelligent transaction manager extract operative to extract and install reusable business transactions, an anomaly tracking and reporting system, and a performance metrics portal for aggregating system performance data, wherein the plurality of applications are integrated via the reusable business transactions thereby allowing for insertion and removal of previously separate applications without redevelopment.

In still another aspect, a computer program product comprising a computer-readable medium having control logic stored therein to enable a computer to sustain a fleet of configuration-controlled assets is provided. The control logic comprises computer-readable program code for causing the computer to integrate a plurality of previously separate systems with reusable business transactions associated with managing a fleet of assets, to receive operational data associated with at least one vehicle of the fleet, to integrate the operational data per customer requirements, to package and distribute the operational data to the plurality of systems, and to install and distribute the operational data to one or more applications of the plurality of systems utilizing at least one of the reusable business transactions.

In yet another aspect, a system for sustaining a fleet of vehicles is provided. The system comprises a plurality of applications associated with the management of a fleet of mobile platforms, a plurality of logical subsystems, each of which is associated with a respective one of the plurality of applications, and a plurality of gateways, each of which connects one of the plurality of applications to a respective one of the plurality of logical subsystems and converts the data flow between the applications and the subsystems.

Additionally, a method for managing the insertion and removal of previously separate domain applications that have been integrated with one another is provided. The method comprises configuring an extended application interface to connect the domain applications together, providing a gateway operative to interface reusable transactions with the domain applications, operating a transaction manager to extract and install the reusable transactions, and implementing an application adapter for each new domain application to be added, with the application adapter configured to interface the new domain application to the extended application interface.

DETAILED DESCRIPTION OF THE INVENTION

Figure 1:
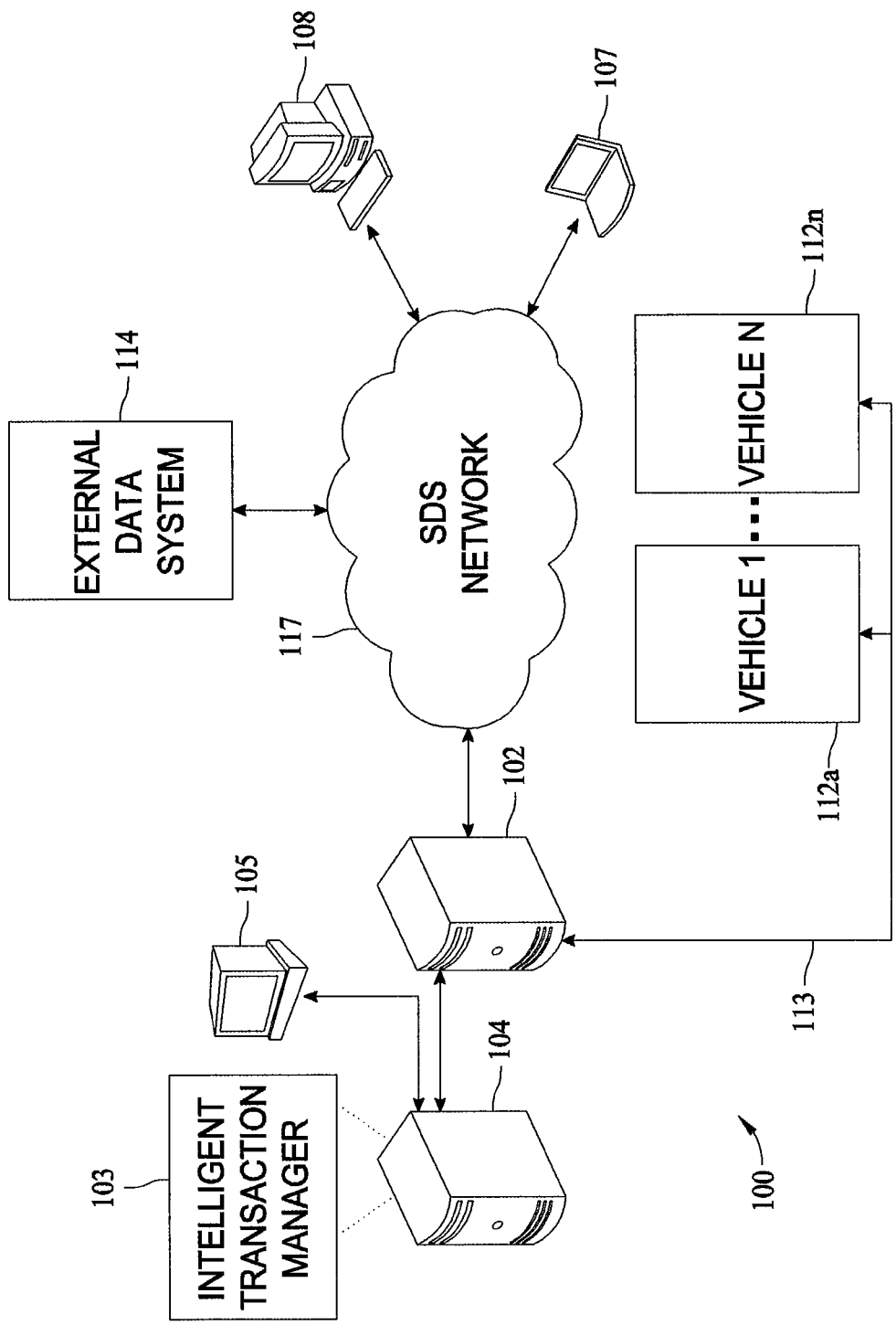
FIG. 1 is a schematic diagram illustrating aspects of a networked operating environment.

As described briefly above, embodiments of the present invention provide an architectural approach to an integrated fleet management system where the definition of the functional capability required by the overall system is kept independent from the application used to support that capability. This approach facilitates future modifications to the system by allowing individual applications to be replaced without affecting the overall capability of the system. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Referring now to the drawings, in which like numerals represent like elements through the several figures, aspects of the present invention and the illustrative operating environment will be described. FIGS. 1-5c and the following discussion are intended to provide a brief, general description of a suitable computing environment in which the embodiments of the invention may be implemented. While the invention will be described in the general context of program modules that execute in conjunction with a BIOS program that executes on a personal or server computer, those skilled in the art will recognize that the invention may also be implemented in combination with other program modules. It should be noted that hereinafter, the words module and application will be used interchangeably.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

Embodiments of the present invention disclose a sustainment data system (SDS). The SDS is a net-centric system-of-systems support architecture that includes support system elements to provide decision-aided, seamless integration and management of support resources and processes. This net-centric system functionality is based upon access to a network. Use of the SDS optimizes cost, availability, and capability of supported systems through integration with both customers and partners of the entity using the SDS. By developing and implementing common processes to integrate disparate systems in a reusable fashion, the SDS reduces systems development time and allows its integration efforts to be extensible to the commercial world.

Referring now to FIG. 1, a schematic diagram illustrating aspects of a networked operating environment 100 utilized in an illustrative embodiment of the invention will be described. As shown in FIG. 1, the networked environment 100 includes an SDS server 102 in communication with a backend server 104. The backend server 104 includes an intelligent transaction manager (ITM) 103 that contains reusable business transactions defined via a collaborative development process including input at one or more workstations 105. Capabilities of the previously separate systems are defined by reusable business transactions. The SDS server 102 implements reusable business transactions from the ITM 103 residing on the backend server 104. Data associated with a fleet of configuration-controlled vehicles 112a-112n may be transferred to the SDS server 102 via a portable disk or a vehicle communications bus 113.

The SDS server 102 is accessible to personal computer (PC) 108 and/or a laptop 107 via a SDS network 117. Examples of such a network include the Internet or an intranet. The networked environment 100 also includes an external data system 114, such as an engineering data system and/or a logistics data system for updating and receiving data associated with engineering and/or logistics analysis. Additional details regarding the SDS server 102 will be described below with respect to FIGS. 2-3.

Figure 2:
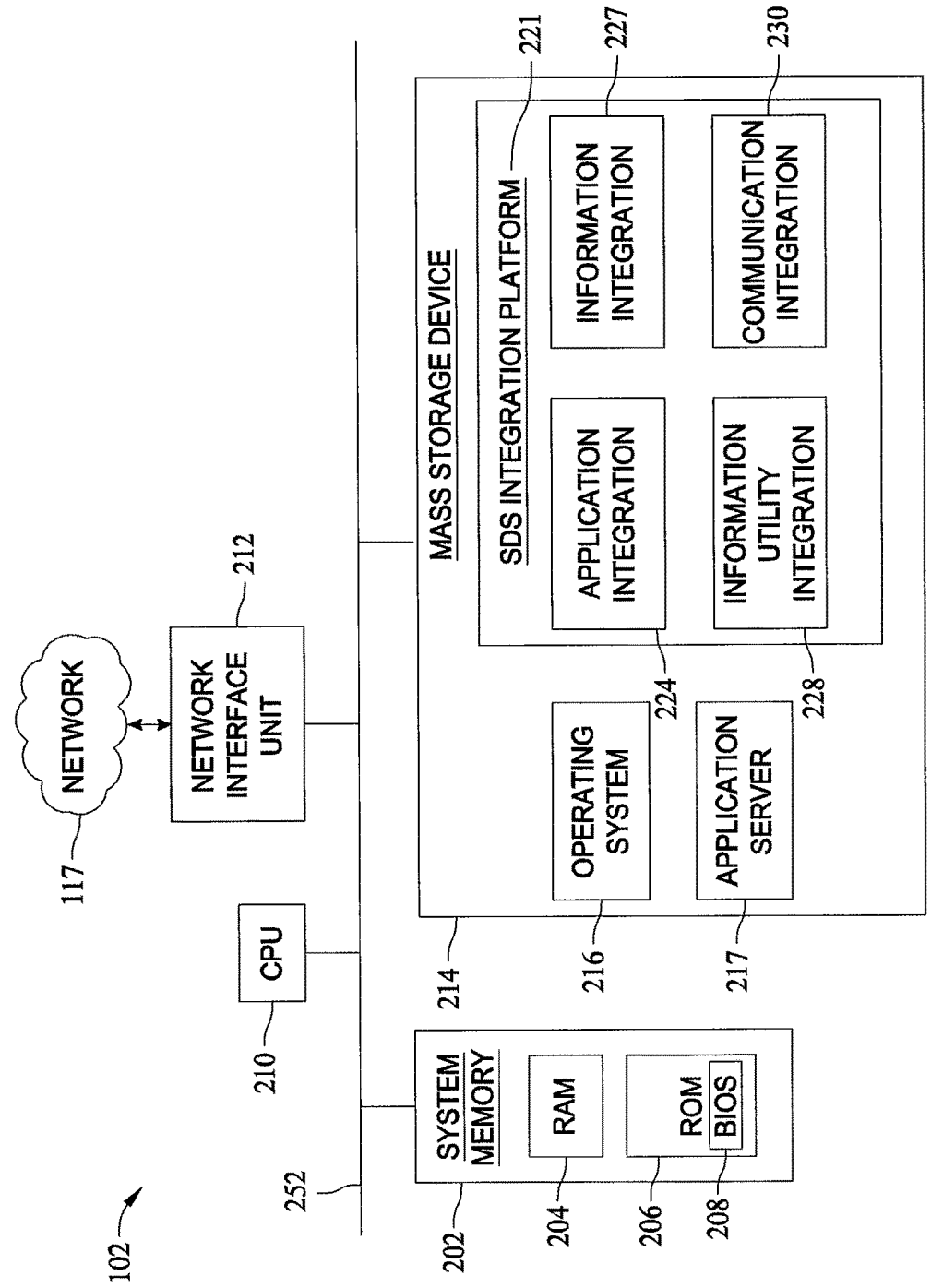
FIG. 2 illustrates computing system architecture for a sustainment data system (SDS) server computer.

FIG. 2 illustrates a computing system architecture for the SDS server 102 utilized in an illustrative embodiment of the invention. The SDS server 102 includes a central processing unit (CPU) 210, a system memory 202, and a system bus 252 that couples the system memory 202 to the CPU 210. The system memory 202 includes read-only memory (ROM) 206 and random access memory (RAM) 204. System memory may also include non-volatile memory (not shown) that is not ROM. A basic input/output system 208 (BIOS), containing the basic routines that help to transfer information between elements within the SDS server 102, such as during start-up, is stored in ROM 206. The SDS server 102 further includes a mass storage device (MSD) 214 for storing an operating system 216 such as WINDOWS XP, from MICROSOFT CORPORATION of Redmond, Wash., an application server 217, such as those compliant with J2EE, (Java 2, Enterprise Edition), from SUN MICROSYSTEMS INC. of Santa Clara, Calif., and an SDS integration platform 221 for integrating previously separate systems or applications associated with the sustainment of assets, such as the fleet of vehicles 112a-112n. The SDS integration platform 221 may occupy one or more nodes or servers. The SDS platform 221 includes an application integration section 224, an information integration section 227, an information utility integration section 228, and a communication integration section 230. Additional details regarding the SDS integration platform 221 will be described below with respect to FIGS. 3-4.

It should be appreciated that the MSD 214 may be a redundant array of inexpensive discs (RAID) system for storing data. The MSD 214 is connected to the CPU 210 through a mass storage controller (not shown) connected to the system bus 252. The MSD 214 and its associated computer-readable media, provide non-volatile storage for the SDS server 102. Although the description of computer-readable media contained herein refers to a mass storage device, such as a hard disk or RAID array, it should be appreciated by those skilled in the art that computer-readable media can be any available media that can be accessed by the CPU 210.

The CPU 210 may employ various operations, discussed in more detail below with reference to FIG. 4 to provide and utilize the signals propagated between the SDS server 102 and networked data systems (FIG. 1). The CPU 210 may store data to and access data from MSD 214. Data is transferred to and received from the MSD 214 through the system bus 252. The CPU 210 may be a general-purpose computer processor. Furthermore as mentioned below, the CPU 210, in addition to being a general-purpose programmable processor, may be firmware, hard-wired logic, analog circuitry, other special purpose circuitry, or any combination thereof.

According to various embodiments of the invention, the SDS server 102 operates in a networked environment, as shown in FIG. 1, using logical connections to remote computing devices via network communication, such as an Intranet, or a local area network (LAN). The SDS server 102 may connect to the network 117 via a network interface unit 212. It should be appreciated that the network interface unit 212 may also be utilized to connect to other types of networks and remote computer systems.

A computing system, such as the SDS server 102, typically includes at least some form of computer-readable media. Computer readable media can be any available media that can be accessed by the SDS server 102. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules, or other data. Computer storage media includes, but is not limited to, RAM, disk drives, a collection of disk drives, flash memory, other memory technology or any other medium that can be used to store the desired information and that can be accessed by the SDS server 102.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

Figure 3A:
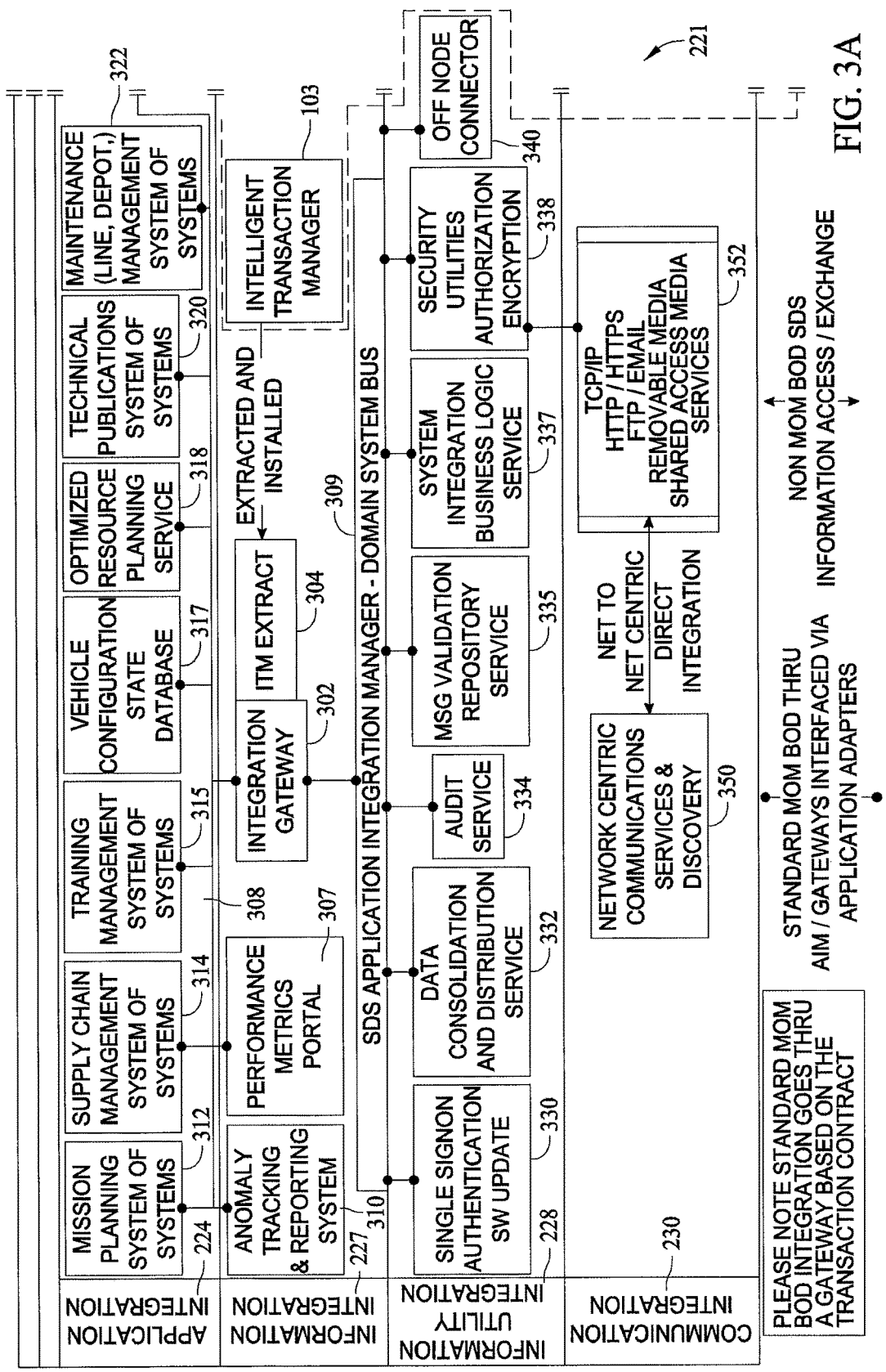
FIGS. 3a-3b illustrate a block diagram of an SDS integration platform based on the computer of FIG. 2.
Figure 3B:
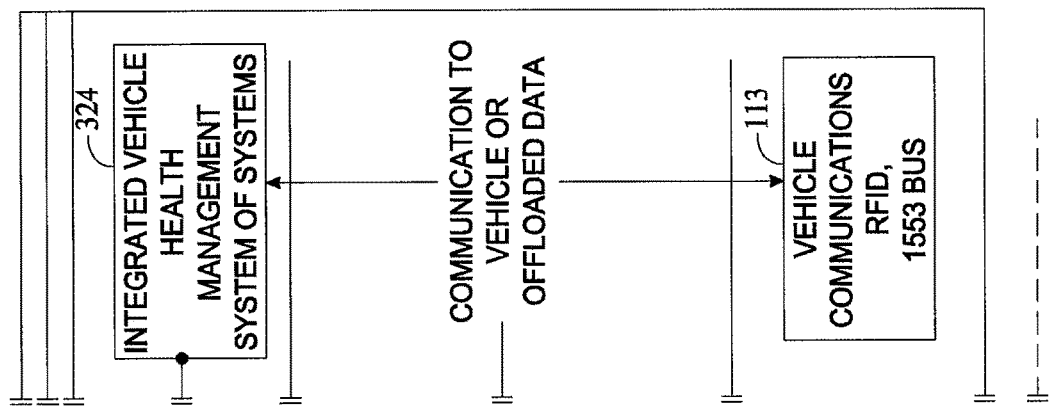

FIGS. 3A-3B illustrate a block diagram of the SDS integration platform 221 illustrated in FIG. 2 according to an illustrative embodiment of the invention. The SDS integration platform 221 accomplishes its goal of application integration via the technical implementation of business-level, application-to-application message contracts. The main benefit of this approach is that substituting new applications requires only an implementation of an application adapter 308 for each new application instead of complete redevelopment effort to re-implement a point-to-point connection.

The SDS integration platform 221 is a net-centric system-of-systems support architecture that includes support system elements to provide decision-aided, seamless integration, and management of support resources and processes to optimize cost, availability, and capability of supported systems. The SDS approach is to provide a lightweight flexible integration environment to connect existing systems with intelligent programmable business logic contained in modular application gateway connectors, such as the application adapters 308, thru verified transactions with anti-spoofing capabilities. These verified transactions may use industry standard message formats (Open Application Group Integration Specification Business Object Document (OAGIS BOD)) to provide additional value through the analysis of Integrated Vehicle Health Management (IVHM) data, increased efficiencies for supply chain management (SCM), optimization of maintenance planning and scheduling, or other sustainment-specific analysis activities.

This approach enables, with minimal effort, the substitution of different off-the-shelf software packages into the solution universe while not interfering with the underlying system functionality. The SDS application approach combines existing message-oriented middleware (MOM) and Service-Oriented Architecture (SOA) with modular application gateway connectors, and secure, industry-standard formatted messages. This provides a secure, fully integrated, and extensible application environment that may be applied in any arena requiring configuration-managed maintenance and automated advanced planning for optimized results. This application framework may be extended outside of this arena. The purpose of SDS is to build a sustainment solution, using tools inside of the constraints that a customer may levy on the sustainment solution provider. These constraints may include cost, existing infrastructure, and security.

Information Integration

The SDS integration platform 221, through its system-of-systems approach, provides an extended application bus allowing applications to be connected together through the use of a lightweight MOM, such as an application integration manager 309 operative to manage the insertion and removal of applications to and from the integrated applications. The information integration section 227 also includes an integration gateway 302 operative to interface reusable business transactions with applications, one or more application adapters 308 interfacing a plurality of applications with the integration gateway 302, and an intelligent transaction manager extract 304 operative to extract and utilize reusable business transactions from the intelligent transaction manager 103.

Additionally, the information integration section 227 includes an anomaly tracking and reporting system 310 and a performance metrics portal 307 for aggregating system performance data. Both the anomaly tracking and reporting system 310 and the performance metrics portal 307 are accessible to any application integrated into the SDS integration platform 221. Each application is integrated via a reusable business transaction, thus allowing for insertion and removal of previously separate applications without the need to redevelop the interface for that application. The reusable business transactions can surface previously latent features in one or more of the integrated applications. Also, while reusable business transactions are documented in eXtensible Markup Language (XML), storage and representation of the reusable business transactions are enabled to extend to alternative technologies.

Information Utility Integration

The information utility integration section 228 includes a single sign-on authentication module 330 operative to manage users of the system via a central authoritative logon point for all the integrated applications. The single sign-on module 330 is also operative to identify and authenticate a user, and issue role-based credentials for the user to use during an engagement, such as from a time of logon through a time of logout with a maximum time period. Additionally, the information utility integration section 228 includes a data consolidation and distribution service 332, an audit service 334, a message validation repository service 335, and a system integration and business logic service 337. Still further, the information utility integration section 228 includes a security utilities, authorization, and encryption service 338 and an off node connector 340. Each utility service is connected to an application adaptor 308. The security utility service 338 includes authorization and encryption utilities. The authorization utility service verifies reusable business transactions against a primary real-time repository and/or a runtime extract of the repository. The encryption utility service is used to encrypt the payload of the messages. The encryption utility service is replaceable to meet the varied levels need for security and export control.

The system integration business logic service 337 is operative to instantiate a service-oriented architecture (SOA), permit interconnection of previously separate applications through the reusable business transactions, and prohibit direct use of external interfaces controlled by the system. This is accomplished by executing program code through this service; to enable the exchange of information, the business logic service may execute a programming language similar to Business Process Execution Language (BPEL). Additionally, the SDS integration platform 221 is operative to implement modular advanced services for the integrated applications, thus adding capability to the system via a utility application that leverages the reusable business transactions when a customer needs capability beyond existing capability of the application. Still further, the SDS integration platform 221 is also operative to implement an integrated transmission test capability to capture transmitted reusable business transactions in an audit log.

Application Integration

An application integration section 224 may include a variety of off-the-shelf and/or proprietary applications such as a mission planning system 312, a supply chain management system 314, a training management system 315, and a vehicle configuration and state database 317. Additionally, the application integration section 224 includes an optimized resource planning service 318, a technical publications system 320, a maintenance management system 322, and an integrated vehicle health management system 324. The vehicle health management system 324 may communicate with one or more vehicles via the vehicle communications bus 113 connecting up or receiving media from a vehicle that is plugged into the computer. Data may be retrieved via a direct cable connection with the vehicle, or may be retrieved via a removable computer storage medium such as a floppy disk, PCMCIA card, or other portable device.

Communication Integration

The communication integration section 230 includes protocol services 352 including TCP/IP and a net-centric communications services and discovery module 350 including a server application, such as a Java compliant application server.

SDS Business End to End Sustainment Integration

Figure 4:
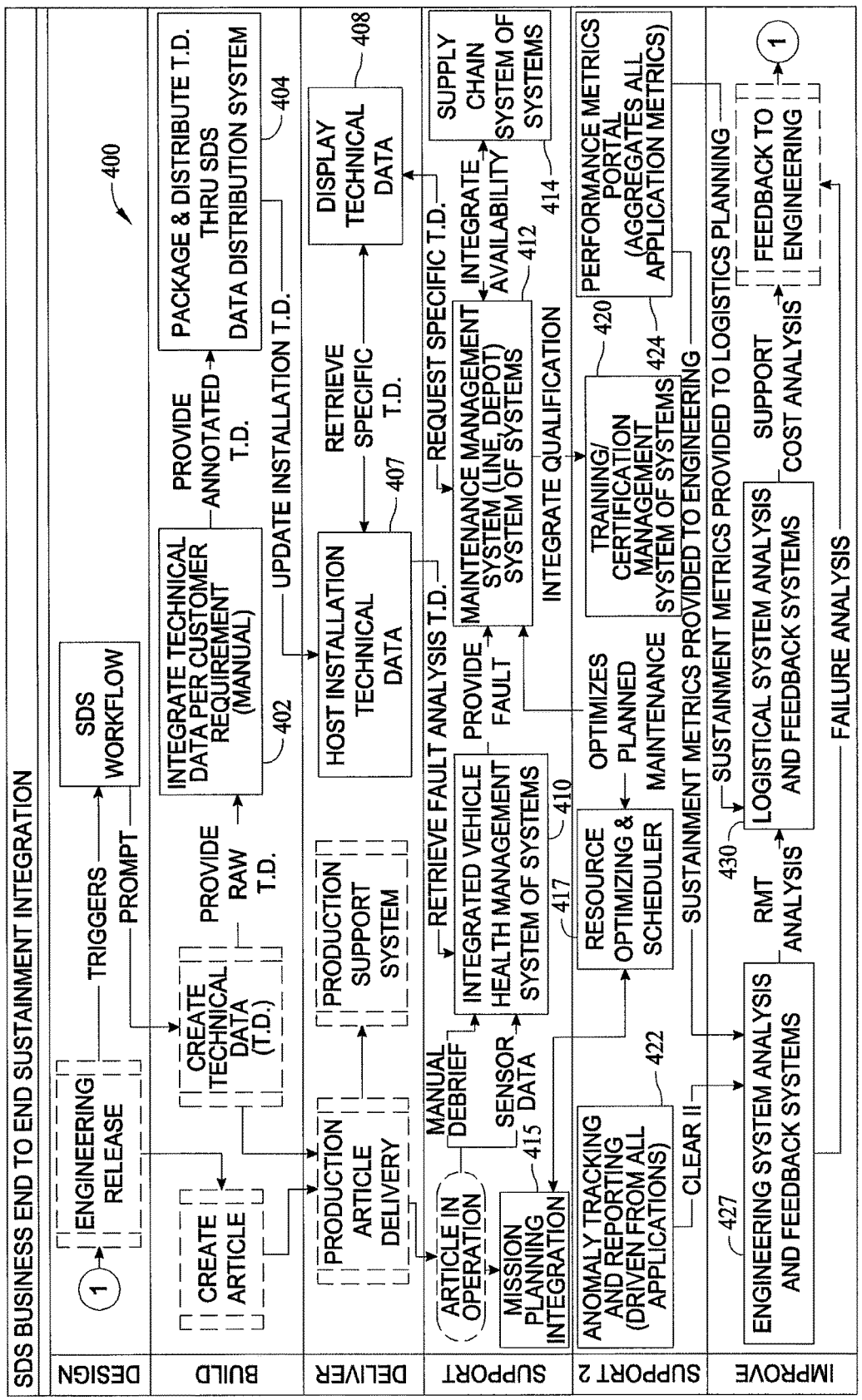
FIG. 4 illustrates an operational flow performed in sustaining configuration-controlled vehicles.
Figure 4A:
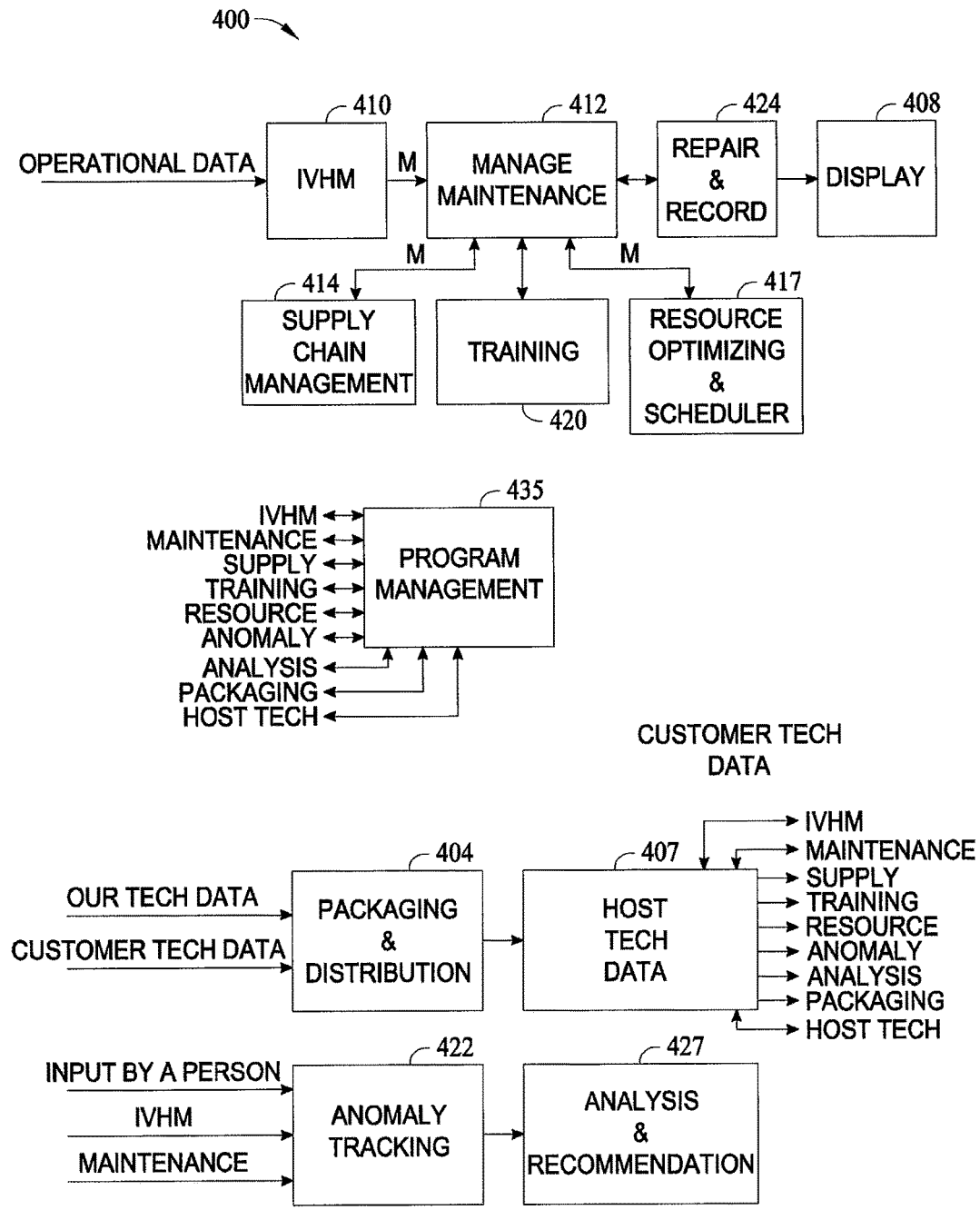
FIG. 4a illustrates a simplified version of FIG. 4.

Referring now to FIGS. 1-4a, operational flow 400 performed in sustaining configuration-controlled vehicles or assets will be described. FIG. 4 is an illustrative routine or operational flow performed in sustaining configuration-controlled assets according to an illustrative embodiment of the invention and FIG. 4a is a simplified version of FIG. 4. When reading the discussion of the routines presented herein, it should be appreciated that the logical operations of various embodiments of the present invention are implemented (1) as a sequence of computer-implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4 and 4a, and making up the embodiments of the present invention described herein are referred to variously as operations, structural devices, acts, or modules. It will be recognized by one skilled in the art that these operations, structural devices, acts, and modules may be implemented in software, in firmware, in special-purpose digital logic, and any combination thereof without deviating from the spirit and scope of the present invention as recited within the claims set forth herein.

The SDS server 102 is designed to integrate applications in the logistics sustainment support (LSS) domain. The SDS server 102 addresses the integration of maintenance systems with supply chain, with vehicle operational data, with qualification of personnel, and with parts and support equipment systems. The SDS server 102 does not limit the systems being integrated to a single vendor or source. The SDS integration approach documents the integration contracts for transactions between the LSS business systems. For instance the SDS server 102 utilizes a method of integrating previously separate domain applications. This represents a method to recognize, document, optimize, and codify a business process in areas of interest between previously separate applications. The SDS server 102 decouples system capability from functional assignment within each business system via the designed business contract, negotiated business transaction between systems, and system assignment to a contract. This allows for the substitution of applications should an application become unavailable.

The operational flow 400 begins with the SDS server 102 integrating technical data received from an engineering data system according to customer requirements. At operation 404, the SDS server 102 packages and distributes the integrated technical data thru a distribution system of the SDS integration platform 221. Then, at operation 407, the SDS server 102 installs and distributes the technical data to one or more applications of the integrated systems utilizing one or more reusable business transactions. The SDS server may also render a display of the operational data at operation 408.

As an article, aircraft, or vehicle completes a mission or an operation where usage occurs, the SDS server 102 receives sensor data and a manual debrief at operation 410 via the integrated vehicle health management system (IVHM) 324. Also at operation 410, the SDS server 102 transfers fault or exceedence data to the maintenance management system 322. Next at operation 412, the SDS server 102 evaluates and determines maintenance needs of the vehicle for which data was received to create a work order. Then at operation 414, the SDS server 102 determines whether parts are available within a supply chain to fulfill the work order at the supply chain management (SCM) system 314.

Meanwhile at operation 417, the SDS server 102 determines an optimal schedule to perform the work order via the optimized resource planning service 318. The SDS server 102 may also, at operation 420, asynchronously determine whether a trained resource is available to perform the work order via the training management system. The SDS server 102 may also plan a mission for one of more vehicles via the mission planning system 312 and optimize the plan via the optimized resource planning service 318.

Once performance of the workorder is completed, the SDS server 102 records the work performed at operation 424 via the performance metrics portal 307, aggregates metrics data associated with sustaining the fleet, and calculates one or more key performance indicators (KPIs) based on the metrics data collected. The KPIs have been previously identified by a customer. The SDS server 102 may also asynchronously track and report on anomalies detected via one or more of the integrated systems at operation 422.

Next at operation 427, the SDS server 102 forwards metrics data or the KPIs for engineering system analysis and feedback. The data may be forwarded to an external data system such as the data system 114. Here the metrics data or KPIs are analyzed for reliability, maintainability, and performance trends related to the fleet and its assets. The SDS server 102 may also forward metrics data or the KPIs for logistical system analysis and feedback at other operations. Control passes back to engineering operations at connector 1 where the business process resumes.

It should be appreciated that the SDS server 102 manages users of the integrated applications or systems via a central authoritative logon for all of the systems. The SDS server 102 receives logon inputs from one or more users, identifies and authenticates the users, and issues a role-based credential for each user to be used during a user session accessing one or more of the integrated systems. A user's role is assigned by this mechanism and persisted across all systems. All of the integrated systems tie into a single management dashboard presentation that displays KPIs and provides decision support for the various levels of a customer's organization.

Figure 5:
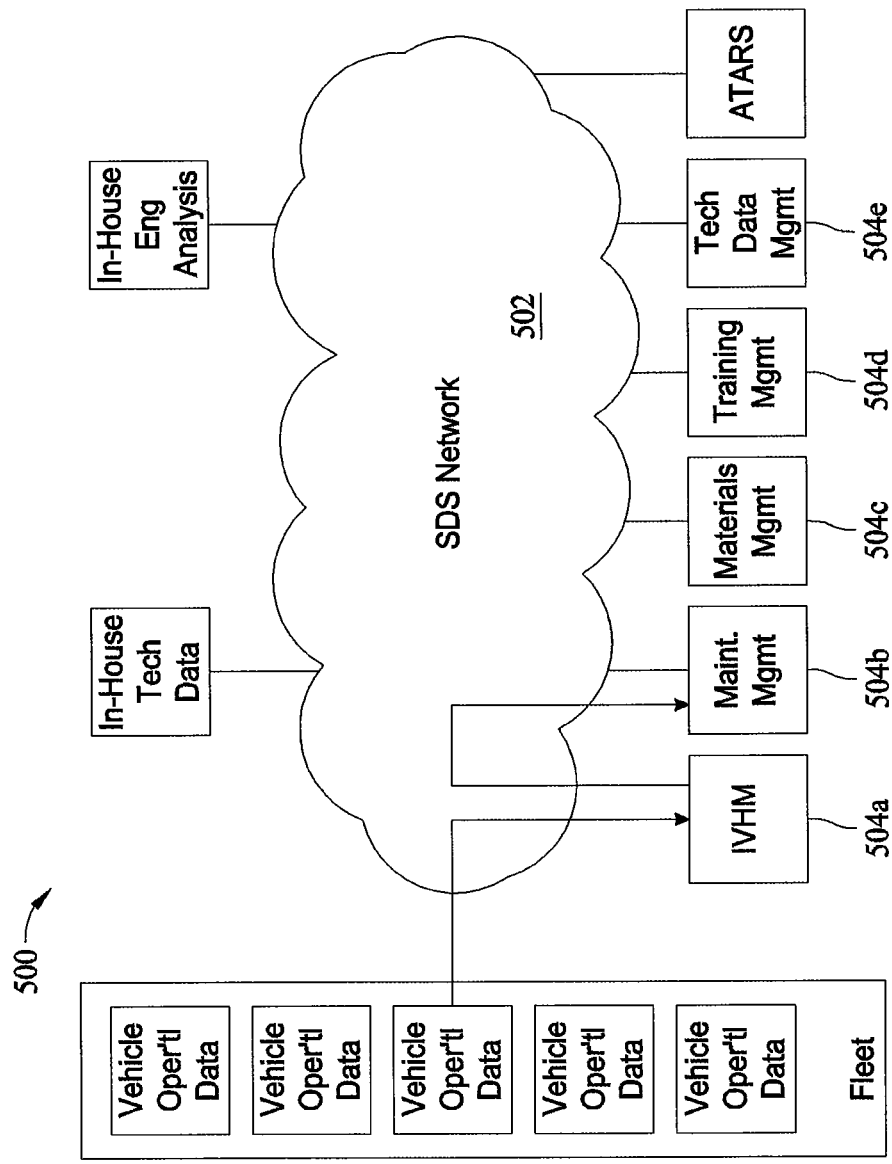
FIG. 5 illustrates aspects of a networked operating fleet management system.

Referring now to FIG. 5, there is shown a schematic diagram illustrating aspects of a networked fleet management system 500 of this invention. The fleet management system 500 utilizes a sustainment data system (SDS) 502. The SDS is a network-centric system-of-systems support architecture that provides seamless integration between different system applications 504 in order to automate the fleet management process. It should be noted that hereinafter the sustainment data system (SDS) and the SDS network are used interchangeably. The SDS network 502 connects various applications 504 such as integrated vehicle health management 504a, maintenance management 504b, materials management 504c, training management 504d, and technical data management 504e.

Figure 5A:
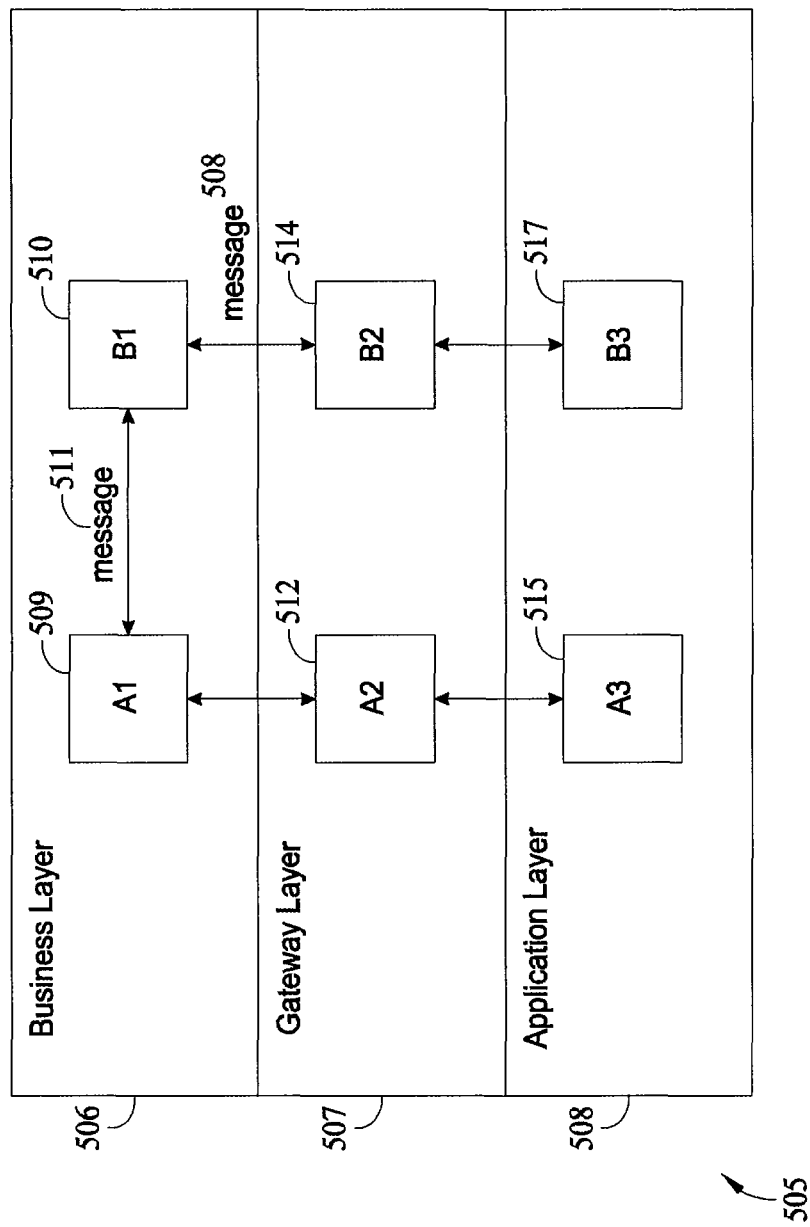
FIGS. 5a-5c illustrate a block diagram of a service-oriented architecture (SOA) implemented by an SDS integration platform.
Figure 5B:
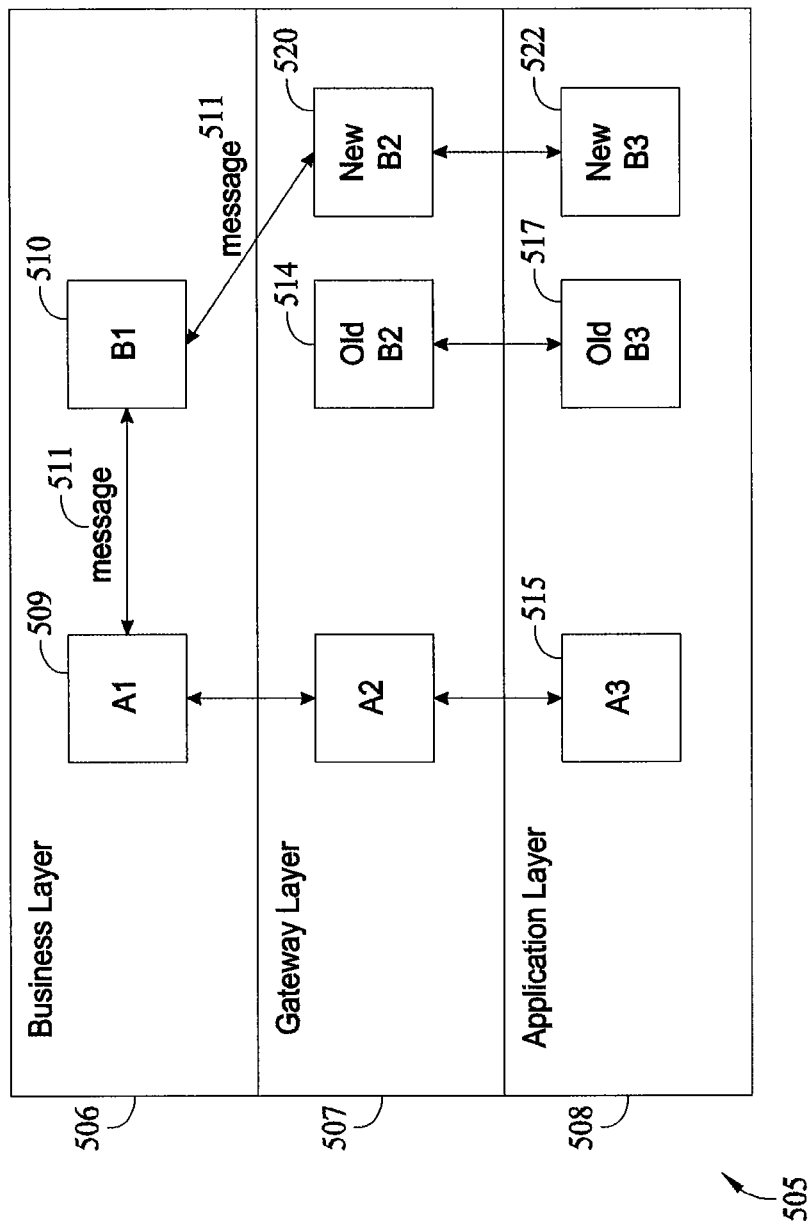
Figure 5C:
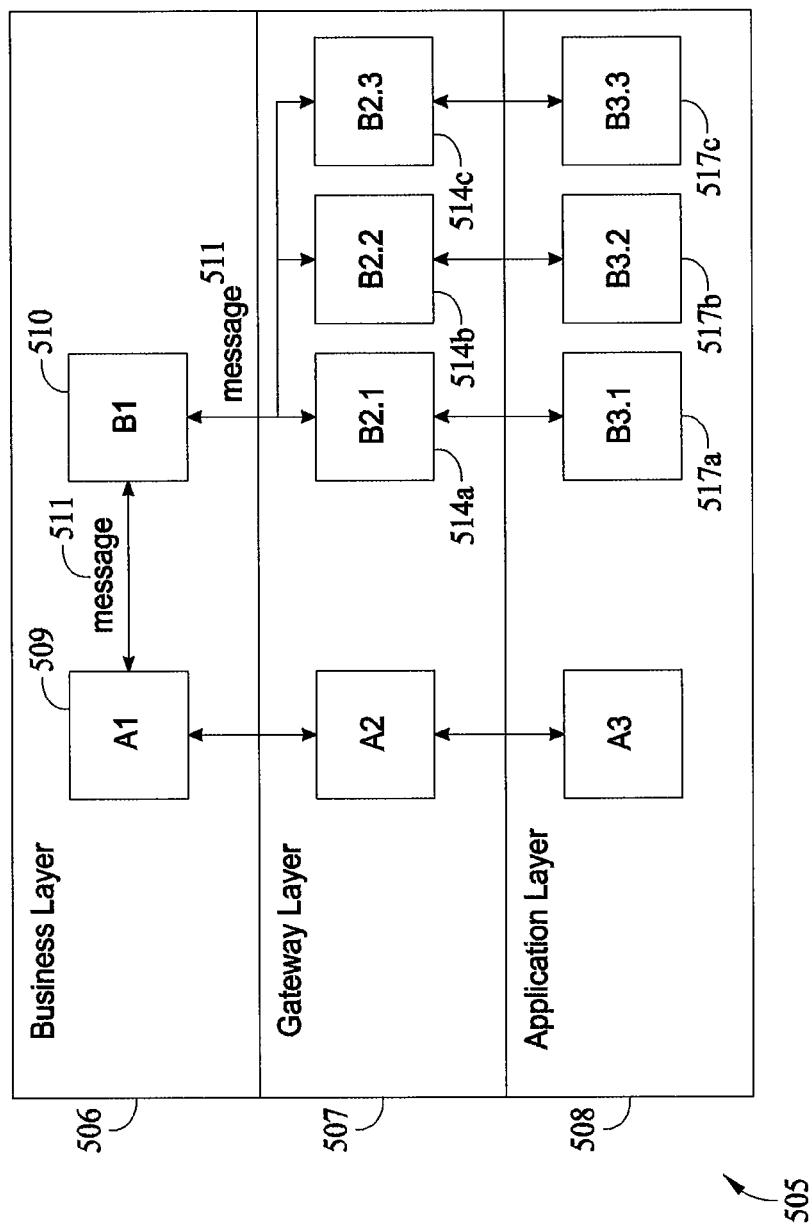

FIGS. 5a-5c illustrate a service oriented architecture SOA 505 implementation of the SDS network 502 of FIG. 2. The SOA 505, in FIG. 5a, includes a business layer 506, a gateway layer 507, and an application layer 508. The business layer 506 includes logical subsystems or components of each integrated system-of-systems, such as logical subsystems A1 509 and B1 510. Physical communication between the integrated systems occurs via the business layer 506 utilizing reusable business transactions such as a message 511. The reusable business transactions are represented by a set of messages 508 which constitute a common format for communication between the subsystems. For a more detailed explanation of the reusable transactions, reference is made to U.S. patent application Ser. No. 11/343,137, filed Jan. 30, 2006, which is hereby incorporated by reference.

The gateway layer 507 includes gateways, such as gateways A2 512 and B2 514, which connect logical subsystems of the business layer 506 such as subsystems A1 509 and B1 510 to the applications of the application layer 508 such as applications A3 515 and B3 517 respectively. For instance, the logical subsystem B1 510 is connected to the application B3 517 via the gateway 514. It should be noted that the business layer 506 uses a common format defined by the messages 508. However, the application layer 508 may require a plurality of formats each of which associated with one of its applications. In other words, multiple applications may use the same gateway and support the same logical subsystem. The supporting applications are transparent to the end user of the system, as illustrated in FIG. 5C, described herein.

The gateway 514 converts the data flow between the logical subsystem B1 510 and the application B3 517 to allow the application layer 508 and the business layer 506, which require different formats, to communicate with each other. For example, the gateway 514 converts messages from logical subsystem B1 510, such as the message 508, to a format used by the application B3 517 and visa versa. Hereinafter, convert shall mean performing one or more of the following actions: translating, reformatting, repackaging, and filtering.

In the system of FIG. 5a, communication from the application A3 515 to the application B3 517 is routed via the business layer 506 through the gateways A2 and B2 to facilitate flexible changes to the application layer 508 with minimal changes to the business layer 506. Additional details regarding facilitating changes to the application layer 508 will be described below with respect to FIG. 5b.

FIG. 5b illustrates the SOA 505' when a change to the application B3 517 occurs. When the application B3 517 is replaced by a new application B3 522, a new gateway B2 520 is also generated to convert the communication format to and from the new application B3 522. For instance, the new gateway B2 converts the message from the logical subsystem B1 517, such as the message 508, to a format used by the new application B3. Similarly, when the new application B3 produces a result, the new gateway B2 converts the result to be presented in the form of a defined message such as message 508. Applications can be replaced, without affecting the overall SDS system of systems, by selecting a new application, such as the new B3, implementing a new gateway, such as the new B2, and attaching the new gateway to the subsystem B1.

FIG. 5c illustrates the SOA 505" according to another embodiment of the present invention. A logical subsystem, such as the logical subsystem B1 510', may use a single application within the SOA 505". However, the logical subsystem B1 510' may also use a combination of applications, such as the applications 517a-517c, where each application is mediated by a gateway, such as gateways 514a-514c.

Thus, the present invention is presently embodied as methods, systems, computer program products or computer readable mediums encoding computer programs for sustaining a fleet of configuration-controlled vehicles.

The above specification, examples and data provide a complete description of the manufacture and use of the composition of the invention. Therefore, while the invention has been described in terms of various specific embodiments, those skilled in the art will recognize that the invention can be practiced with modification within the spirit and scope of the claims.

What is claimed is:

1. A computer-implemented method for sustaining a fleet of configuration-controlled assets, the method implemented using a sustainment data system (SDS) server including a processor in communication with a memory, the method comprising:
    integrating a plurality of previously separate computer applications each including specific reusable business transactions associated with managing a fleet of assets, wherein functional capabilities of individual computer applications of the plurality of previously separate computer applications are defined by one or more of the specific reusable business transactions executable therein, wherein the plurality of previously separate computer applications are separate from the assets of the fleet of assets, and wherein a first computer application of the plurality of previously separate computer applications communicates via a first communication format to a first gateway, where the first gateway communicates with the SDS server via a second communication format;
    receiving, by the SDS server from an engineering data system, technical data associated with one asset of the fleet of assets, wherein the engineering data system is separate from the one asset of the fleet of assets;
    translating, by the SDS server, the received technical data from a third communication format associated with the engineering data system to the second communication format associated with the SDS server;
    transmitting, from the SDS server to the first gateway associated with the first computer application, the translated technical data;
    converting, by the first gateway, the translated technical data from the second communication format to the first communication format;
    transmitting, from the first gateway to the first computer application, the converted technical data, wherein the first computer application is configured to utilize at least one of the specific reusable business transactions, wherein the first computer application is further configured to install the converted technical data, and wherein the first computer application is separate from one asset of the fleet of assets;
    receiving, by the SDS server from the at least one asset, sensor data associated with a first mission completed by the at least one asset;
    determining, by the SDS server, a work order and a schedule to perform the work order, based on the received sensor data for the at least one asset, an availability of a trained resource to perform the work order, and the technical data;
    transmitting, from the SDS server to a computer system associated with a user, the work order and the schedule for display to the user;
    planning, by the SDS server, using one or more of the previously separate computer applications, a second mission for the at least one asset; and
    transmitting, from the SDS server to the computer system associated with the user, the second mission for display to the user.

2. The method of claim 1, further comprising:
    determining whether parts are available to fulfill the work order.

3. The method of claim 2, further comprising receiving performance of the work order and recording the work performed.

4. The method of claim 2, further comprising tracking and reporting one or more anomalies detectable via one or more of the plurality of previously separate computer applications.

5. The method of claim 2, further comprising:
    aggregating metrics data associated with sustaining the fleet of assets; and
    calculating one or more key performance indicators (KPIs) based on the metrics data collected wherein the one or more KPIs are identified by a customer.

6. The method of claim 5, further comprising:
    forwarding at least one of the metrics data or the KPIs for engineering system analysis and feedback; and
    analyzing the metrics data or KPIs for reliability, maintainability, and performance trends related to the fleet of assets and the assets.

7. The method of claim 6, further comprising:
    forwarding at least one of the metrics data or the KPIs for logistical system analysis and feedback; and
    analyzing the metrics data or KPIs for logistical reliability, logistical maintainability, and logistical performance trends related to the fleet of assets and the assets.

8. The method of claim 1, further comprising managing users of the plurality of separate computer applications via a central authoritative logon for the plurality of previously separate computer applications.

9. The method of claim 8, wherein managing users via the central authoritative logon comprises:
    receiving logon inputs from one or more users;
    identifying and authenticating the one or more users; and
    issuing a role-based credential for each of the one or more users to be used during a user session accessing one or more of the plurality of previously separate computer applications.

10. The method of claim 1, wherein the plurality of previously separate computer applications comprise at least two of a vehicle mission planning system, a supply chain management system, a training management system, a vehicle configuration state database, an optimized resource planning service, a technical publications system, a maintenance management system, and an integrated vehicle health management system.

11. A computer-readable non-volatile medium having control logic stored therein for causing a sustainment data system (SDS) server to sustain a fleet of configuration-controlled assets, the SDS server including a processor in communication with a memory, the control logic comprising computer-readable program code for causing the SDS server to:

integrate a plurality of previously separate computer applications each including specific reusable business transactions associated with managing a fleet of assets, wherein functional capabilities of individual computer applications of the plurality of previously separate computer applications are defined by one or more of the specific reusable transactions executable therein, wherein the plurality of previously separate computer applications are separate from the fleet of assets, and wherein a first computer application of the plurality of previously separate computer applications communicates via a first communication format to a first gateway, where the first gateway communicates with the SDS server via a second communication format;

receive technical data associated with at least one asset of the fleet of assets from a second computer application of the plurality of previously separate computer applications that is separate from the fleet of assets;

integrate the received technical data per customer requirements;

translate the received technical data from a third communication format associated with the at least one asset of the fleet of assets to a second format associated with the SDS server;

transmit, to the first gateway associated with the first computer application, the translated technical data;

convert, by the first gateway, the translated technical data from the second communication format to the first communication format;

transmit, from the first gateway to the first computer application, the converted technical data, wherein the first computer application is configured to utilize at least one of the specific reusable business transactions, and wherein the first computer application is further configured to install the converted technical data, and wherein the first computer application is separate from the at least one asset of the fleet of assets;

receive sensor data associated with a mission completed by the at least one asset, the sensor data received from at least one of the plurality of previously separate computer applications;

determine, based on execution of the plurality of previously separate computer applications, a work order and a schedule to perform the work order, based on the received sensor data for the at least one asset, an availability of a trained resource to perform the work order, and the technical data;

transmit, to a computer system associated with a user, the work order and the schedule for display to the user;

plan, using at least one of the plurality of previously separate computer applications, a second mission for the at least one asset; and transmit, to the computer system associated with the user, the second mission for display to the user.

12. A method for sustaining a fleet of vehicles, the method implemented using a sustainment data system (SDS) server including a processor in communication with a memory, the method comprising:

integrating and executing, within the SDS server, a plurality of modules associated with the management of a fleet of mobile platforms, the plurality of modules including a mission planning system for planning the missions for individual platforms within the fleet of mobile platforms, an integrated vehicle health management system (IVHMS), and a resource planning service for determining schedules for performing work orders on the individual platforms, wherein the plurality of modules are separate from the fleet of mobile platforms, and wherein a first module of the plurality of modules communicates via a first communication format to a first gateway, where the first gateway communicates with the SDS server via the second communication format;

creating, by the SDS server, a predetermined set of messages for allowing the plurality of the modules, including the mission planning system, the IVHMS, and the resource planning service to communicate with each other;

receiving, by the SDS server, technical data associated with at least one individual platform of the fleet of mobile platforms from a second module of the plurality of modules;

translating, by the SDS server, the received technical data from a third format associated with the at least one individual platform of the fleet of mobile platforms to a second format associated the SDS server;

transmitting, from the SDS server to the first gateway associated with the first module, the translated technical data;

converting, by the first gateway, the translated technical data from the second communication format to the first communication format;

transmitting, from the first gateway to the first module, the converted technical data, wherein the first module is configured to utilize at least one reusable business transaction, and wherein the first module is further configured to install the converted technical data;

determining a schedule to perform a work order using results from execution of the resource planning service that are based at least in part on data provided by execution of the mission planning system, an availability of a trained resource to perform the work order, the technical data, and the IVHMS, wherein data provided by the IVHMS includes sensor data associated with missions completed by the individual platforms;

transmitting, to a computer system associated with a user, the work order and the schedule for display to the user;

determining a second mission for the individual platforms using the mission planning system and the resource planning service; and transmitting, to the computer system associated with the user, the second mission for display to the user.

13. The method of claim 12, further comprising the step of monitoring a performance of the plurality of modules.

14. The method of claim 12, further comprising the step of monitoring anomalies detected by the plurality of modules.

15. The method of claim 12, further comprising the steps of analyzing anomalies detected by the plurality of modules and providing a recommendation.

16. A method for managing the insertion and removal of previously separate domain applications that have been integrated with one another, the method implemented using a sustainment data system (SDS) server including a processor in communication with a memory, said method comprising:

configuring an extended application interface to connect the previously separate domain applications together, each previously separate domain associated with an aspect of management of a fleet of assets, wherein the previously separate domain applications are separate from the fleet of assets, wherein a first domain application of the plurality of previously separate domain applications communicates via a first communication format to a first gateway, wherein a second domain application of the plurality of previously separate domain applications communicates via a second communication format to a second gateway, and wherein the first gateway and the second gateway communicate with the SDS server via a third communication format;

receiving, at the first gateway, data from the first domain application for the second domain application, wherein the first domain application and the second domain application are separate from the fleet of assets;

translating, by the first gateway, the received data from the first communication format associated with the first domain application into the third communication format associated with the SDS server;

receiving, at the SDS server, the translated data from the first gateway;

transmitting, from the SDS server, the translated data to the second gateway;

converting, by the second gateway, the translated technical data from the third communication format to the second communication format;

transmitting, from the second gateway to the second domain application, the converted technical data;

operating, by the SDS server, a transaction manager to extract and install one or more reusable transactions;

implementing, in the SDS server, an application adapter for each new domain application to be added, with the application adapter configured to interface the new domain application to the extended application interface;

receiving a plurality of data from the previously separate domain applications, wherein the plurality of data received is associated with the fleet of assets and is one of technical data and sensor data for each of the assets in the fleet of assets, the plurality of data received from a domain application associated with an engineering data system and configured to update at least one of stored engineering data and stored logistics analysis data of at least one asset, the sensor data associated with a mission completed by the at least one asset, the sensor data received from the previously separate domain applications;

aggregating, by the SDS server, data received from the previously separate domain applications; and determining a reliability trend, using the aggregated data, for one or more assets of the fleet of assets.

17. The method of claim 16 wherein configuring the extended application interface to connect the previously separate domain applications together comprises combining message-oriented middleware and service oriented architecture with modular application gateway adapters and standard formatted messages.

18. The method of claim 16 further comprising connecting existing systems with logic contained in modular application gateway connectors through verified transactions with anti-spoofing capabilities.

19. The method of claim 1 further comprising:

determining that the first computer application is replaced with a second computer application, wherein the second computer application communicates via a fourth communication format; and generating a second gateway associated with the second computer application, wherein the second gateway is configured to communicate between the second computer application and the SDS server, and wherein the second gateway is configured to convert communications between the second communication format and the fourth communication format.

20. The method of claim 19 further comprising:

transmitting, from the SDS server to the second gateway associated with the second computer application, the translated technical data;

converting, by the second gateway, the translated technical data from the second communication format to the fourth communication format; and transmitting, from the second gateway to the second computer application, the converted technical data, wherein the second computer application is further configured to install the converted technical data, and wherein the second computer application is separate from the at least one asset of the fleet of assets.

* * * * *